United States Patent [19]

Uemura et al.

[11] Patent Number: 5,312,476

[45] Date of Patent: * May 17, 1994

[54] ZINC ALLOY POWDER FOR ALKALINE CELL AND METHOD FOR PRODUCTION OF THE SAME

[75] Inventors: Toyohide Uemura; Tomotaka Motomura; Tomiko Yamaguchi, all of Takehara; Junichi Asaoka; Shuji Tsuchida, both of Kadoma, all of Japan

[73] Assignees: Matsushita Electric Industrial Co., Ltd.; Mitsui Mining & Smelting Co., Ltd., Tokyo, Japan

[*] Notice: The portion of the term of this patent subsequent to Apr. 28, 2009 has been disclaimed.

[21] Appl. No.: 838,880

[22] Filed: Feb. 18, 1992

Related U.S. Application Data

[63] Continuation-in-part of Ser. No. 701,215, May 16, 1991, Pat. No. 5,108,494.

[51] Int. Cl.⁵ .................... H01M 4/42; C22C 18/00
[52] U.S. Cl. .......................... 75/347; 75/355; 420/513; 420/514; 429/206; 429/229
[58] Field of Search ............. 429/229, 218, 219; 420/513, 514; 75/347, 355

[56] References Cited

U.S. PATENT DOCUMENTS 4,735,876 4/1988 Miura et al. ............. 429/206

FOREIGN PATENT DOCUMENTS 61-77259 4/1986 Japan .
61-153950 7/1986 Japan .
3-22356 1/1991 Japan .

Primary Examiner—R. Dean
Assistant Examiner—Sikyin Ip
Attorney, Agent, or Firm—Bucknam and Archer

[57] ABSTRACT

A non-amalgamated zinc alloy powder for use in an alkaline cell which consists of elements component selected from among the following combinations (1) to (3):

(1) 0.01 to 0.5% by weight of bismuth, 0.01 to 0.5% by weight of indium, not less than 0.005% by weight to less than 0.01% by weight of calcium, (2) not less than 0.005% by weight to less than 0.01% by weight of calcium, 0.01 to 0.5% by weight of bismuth, 0 to 0.5% by weight of aluminium, and (3) 0.01 to 0.5% by weight of lead, 0.01 to 0.5% by weight of indium, 0 to less than 0.01% by weight of calcium, 0.01 to 0.5% by weight of aluminium, the balance being zinc and containing 1 ppm or less of iron, and which can greatly suppress the evolution of hydrogen gas and maintain the discharge performance on a practical level, and the method to produce the same.

10 Claims, 9 Drawing Sheets

ZINC ALLOY POWDER FOR ALKALINE CELL AND METHOD FOR PRODUCTION OF THE SAME

This application is a continuation in part of application Ser. No. 07/701,215, filed May 16, 1991, now U.S. Pat. No. 5,108,494.

BACKGROUND OF THE INVENTION

1. Field of the Invention

The present invention relates to a zinc alloy powder for use in an alkaline cell and a method for the production of the same. More particularly, the present invention is related to a non-amalgamated zinc alloy powder for use in an alkaline cell, which has an iron content of 1 ppm or less and contains specific elements added so as to suppress the evolution of hydrogen gas and to improve the leaktightness of a cell, and a method for the production of the same.

2. Prior Art

The mercury contained in an amalgamated zinc powder used as an anode active material in an alkaline cell has been known to be an essential component for such an active material from the viewpoint of suppressing the evolution of hydrogen gas due to the corrosion of zinc and preventing a liquid from leaking from the cell as a result of the evolution of hydrogen gas.

In light of environmental protection, however, a reduction in the mercury content is required in this field. In line with this requirement, it has become possible to suppress the evolution of hydrogen gas through the addition of not only lead but also aluminum, bismuth, indium and the like as additional elements to zinc so that the mercury content is remarkably reduced from 10% by weight to about 1% by weight.

As further social needs, in recent years, it is required to decrease the mercury content of the anode active material to 0% by weight, in other words, to effect non-amalgamation. This non-amalgamation greatly changes the situation, and it has been difficult to decrease the evolution of hydrogen gas to a desired level even when the above-described additional elements are added. That is, although zinc alloy powders as an anode active material having various types of elements added thereto have been proposed (see, for example, Japanese Patent Laid-Open Nos. 22984/1990 and 153950/1986, it has been impossible to attain the desired suppression of hydrogen gas evolution when the mercury content is 0% by weight, though such suppression has been possible even when the mercury content is 1% by weight or less.

Meanwhile, attempts have been made to suppress the evolution of hydrogen gas and to improve the discharge performance by reducing the impurity content of zinc. For example, Japanese Patent Laid-Open No. 123653/1987 describes a reduction in the content of impurities such as iron and chromium. Table 1 on page 4 of the published specification shows that an improvement in the discharge performance while suppressing the evolution of hydrogen gas is attained by reducing the iron content to about 10 ppm in an anode active material which comprises an amalgamated zinc alloy powder containing predetermined amounts of lead, indium and aluminum and containing 1% by weight of mercury.

However, a zinc alloy powder having a mercury content of 0% by weight could not attain the desired effect of suppressing the evolution of hydrogen gas even when the impurity content was reduced to about 10 ppm and additional elements such as lead were incorporated.

Thus the non-amalgamation of an anode active material is accompanied by a difficulty which is fundamentally different from that encountered in the low amalgamation leading to a mercury content of 0.6 to 1% by weight, and there has not been developed any alkaline cell wherein a non-amalgamated zinc alloy powder is used as an anode active material, the evolution of the hydrogen gas is suppressed, and the leaktightness is improved.

SUMMARY OF THE INVENTION

The present invention has been made to solve the above-described problems of the prior art. It is an object of the present invention to provide a zinc alloy powder for use in an alkaline cell which substantially suppresses the evolution of hydrogen gas and maintains the discharge performance on a practical level in non-amalgamated cells and a method for the production of the same. The final object of the present invention is to improve the leaktightness of a mercury-free alkaline cell.

The present inventors have made intensive studies in line with the above-described objects. As a result, they have found that the objects can be attained by the synergistic effect of the use of zinc having an extremely low content of iron as an impurity and the addition of specific elements thereto, thus accomplishing the present invention.

That is, the zinc alloy powder for use in an alkaline cell according to the present invention consists of elements component selected essentially from among the following combinations (1) to (3):

(1) 0.01 to 0.5% by weight of bismuth, 0.01 to 0.5% by weight of indium, not less than 0.005% by weight to less than 0.01% by weight of calcium, (2) not less than 0.005% by weight to less than 0.01% by weight of calcium, 0.01 to 0.5% by weight of bismuth, 0 to 0.5% by weight of aluminium, and (3) 0.01 to 0.5% by weight of lead, 0.01 to 0.5% by weight of indium, 0 to less than 0.01% by weight of calcium, 0.01 to 0.5% by weight of aluminum, the balance being zinc and containing 1 ppm or less of iron.

DETAILED DESCRIPTION OF THE PREFERRED EMBODIMENTS

In the present invention, it is a requisite that the iron content be 1 ppm or less. When it exceeds 1 ppm, the effect of suppressing the evolution of hydrogen gas is lowered. The expression "the iron content is 1 ppm or less" used herein means that the iron content is not greater than the limiting analylical value as measured by the conventional analytical methods, such as ICP or atomic absorption spectrometry, without separating iron from zinc. No attempt has hitherto been made to use a zinc alloy powder having such a low iron content as an anode active material, nor there has been any report describing such use. A high-purity metallic zinc can be prepared for use in special applications such as a semiconductor by special methods such as zone melting. Such a metallic zinc is so expensive that it cannot be used as the raw material of dry cells. Also there is no example wherein such a metallic zinc has been used as an alloy powder. In rectified zinc which is regarded as having the highest purity out of the zinc ingots obtained by industrial mass production, the iron content prescribed in Japanese Industrial Standards is 20 ppm or less. Among the varieties of the rectified zinc, even the one having a particularly low impurity level generally has an iron content of 2 ppm or greater. Further, the iron content of electrolytic zinc is on the same level.

In the present invention, the zinc alloy contains elements mentioned above. When the content of each component element falls outside the above-described range, there occur problems such as the failure to attain the desired effect of suppressing the evolution of hydrogen gas or the failure to maintain a practical discharge performance. If elements other than the above-described combinations are added, for example, if aluminum, bismuth, calcium or the like, generally incorporated in a zinc alloy powder used as an anode active material, are added alone, the above-described effects of the present invention cannot be attained.

The production method of the present invention will now be described.

In the present invention, a zinc having an iron content of 1 ppm or less is used. Examples of the zinc having such a low iron content include a deposited zinc obtained by electrolysis and a zinc ingot prepared from zinc obtained by distillation. A zinc ingot prepared by melting deposited zinc together with a flux, such as ammonium chloride, and casting the melt into a mold has hitherto been used as a starting zinc material of an anode active material. In such zinc ingot, it is impossible to decrease the iron content to 1 ppm or less. This is because, in general, zinc is contaminated with iron originating in a separator in the step of removing dross formed on the surface of molten zinc and returning partially recovered zinc to the melt. Further, the contamination with iron may occur from a melt pump, a mold or an atmosphere.

Elements to be added described above are dissolved in the melt of a zinc having a low iron content so as to be within predetermined ranges of contents. Then, pulverization is performed by atomization, followed by sifting, to thereby give a zinc alloy powder. It is preferred from the viewpoint of further improving the suppressing effect of hydrogen gas evolution to limit the iron content of the atmosphere for each of the melting and atomization steps to 0.009 mg/m$^3$ or less. From the same viewpoint, it is also preferred to magnetically separate the obtained zinc alloy powder.

Figure 14:
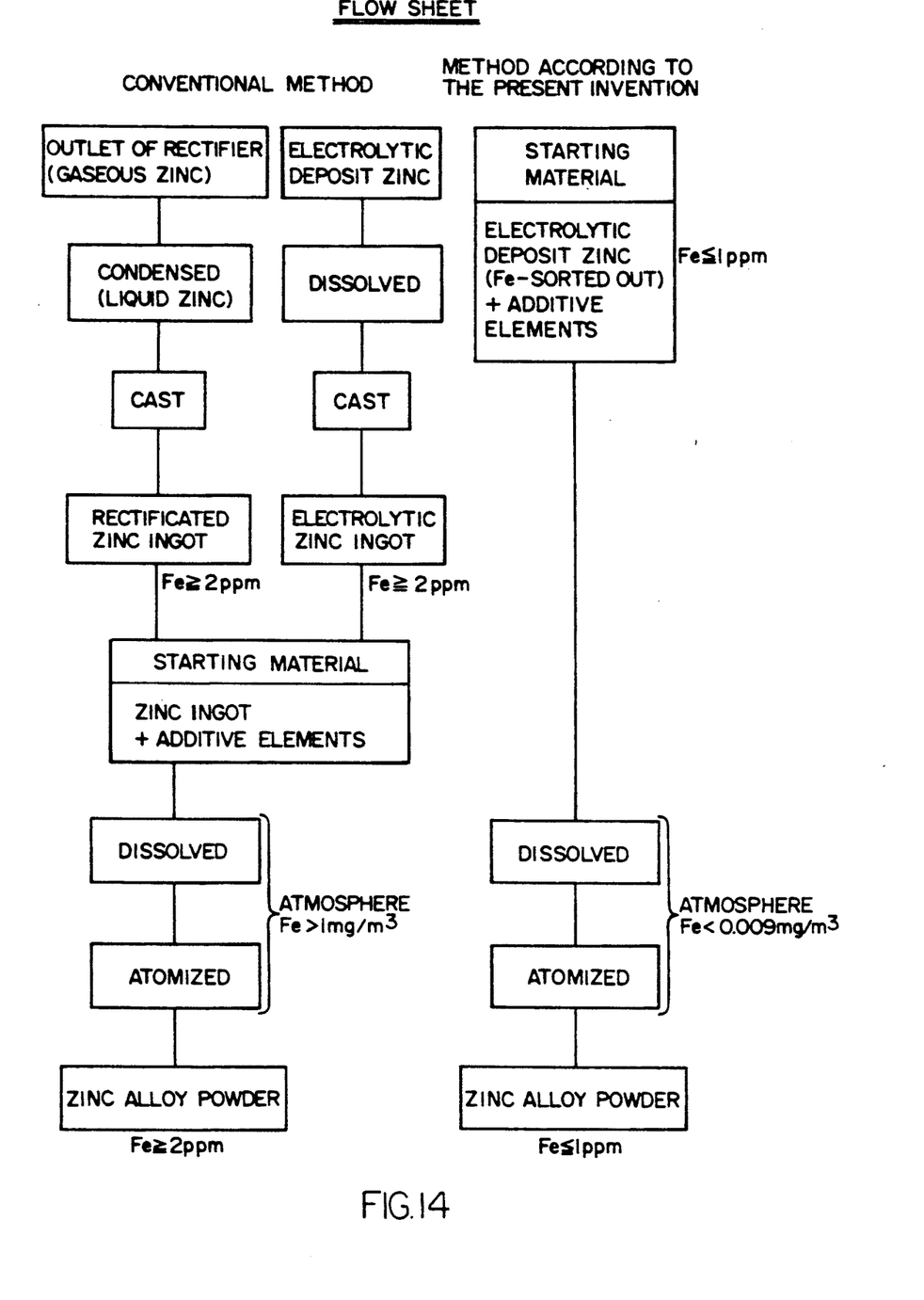
FIG. 14 is a flow sheet illustrating the difference between a convention method of preparation, a zinc alloy powder and the method according to the present invention.

In this manner, the difference between conventional method and method according to the present invention for the production of a zinc alloy powder is shown in FIG. 14 as flow sheet.

The iron content of the resultant zinc alloy powder is 1 ppm or less as described above. This powder can suppress the evolution of hydrogen gas to about 300 $\mu$l/day-cell (type LR6), which is an allowable upper limit of leaktightness, or less.

With respect to the mechanism of evolving hydrogen gas, macroscopic measurements of amount of hydrogen gas evolved and presumptive relations between the gas evolution and the structure of crystals have heretofore only been discussed; but, to elucidate said mechanism, there has been made no practical research into as far as the sites at which the hydrogen gas is evolved. This would be the cause for the fact that various techniques so far applied for a patent were practically unuseful for mercury-free cells, the present inventors thought. Thus, they carefully made microscopic observations and EPMA (Electron Probe X-ray Microanalyzer) analyses of the sites where hydrogen gas was evolved and found that iron, its oxides, alloys and the like in particulate form inevitably contained in zinc powder were sources or causes for evolving hydrogen gas when these particles were present between the zinc particles and/or on the surfaces of the zinc particles.

More specifically, the present inventors microscopically observed that there were specific sites where hydrogen gas was continuously evolved when the zinc powder was immersed in an aqueous solution of potassium hydroxide which was similar to the electrolyte for an alkaline cell. Then, they likewise observed how hydrogen gas was evolved using zinc in the form of comparatively large particles, slender rods or plates to confirm that the gas was evolved at the same sites for a long period of time, after which said sites were marked with a sharp tool. Then, the zinc having said marked sites was analyzed for its composition by EPMA.

As the result of this analysis, it was found that the gas continuous evolution sites necessarily had fine particles of 0.5–5 $\mu$m in particle size mainly containing iron localized therein. As elements other than iron, there were detected chromium, nickel, silver, sulfur and oxygen in some cases. Thus, it was found that the gas evolution was effected in the presence of a very minute amount of particulate iron and/or iron oxide scattered in the zinc body.

As indicated in the Table 1, particles of various solid materials (other than zinc) having an average particle size of 0.1—several mm were attached to zinc powder or zinc plates in such an amount that the particles so attached had a concentration of 1—several ppm, after which the particles—attached zinc samples were immersed in an aqueous solution of potassium hydroxide to observe how hydrogen gas was evolved with the results being shown in Table 1.

TABLE 2

| Gas Evolution Caused by Various Kinds of Particles Added to Zinc | |
|---|---|
| Particles added | State of gas evolution |
| $Fe_2O_3$ (particles) | Vigorous and continuous |
| $Fe_3O_4$ (particles) | Vigorous and continuous |
| $Fe(OH)_2$ (particles) | Slow and gradual |
| $MnO_2$ (particles) | Slow and gradual |
| NiS (particles) | Slow and gradual |
| Stainless steel piece | Vigorous and continuous |
| $Al_2O_8$ (particles) | No evolution |
| CaO (particles) | No evolution |
| $SiO_2$ (partiles) | No evolution |
| Fe (particles) | Vigorous and continuous |
| Cr (particles) | Slow and gradual |
| Ni (particles) | Vigorous and continuous |

It was found from the results that the sites where the gas was evolved were those where particulate iron, iron oxides or stainless steel was present.

The above experiment indicated that the sources of gas evolution were the fine particles of mainly iron type.

In the present invention, therefore, the iron content is minimized and predetermined amounts of specific elements are added, whereby a synergitic effect works to suppress the evolution of hydrogen gas.

As described above, a zinc alloy powder for use in an alkaline cell and having an iron content of 1 ppm or less is produced by melting a zinc having and iron content of 1 ppm or less together with specific elements to give a melt and directly atomizing the melt.

Although this zinc alloy powder is non-amalgamated, it can greatly suppress the evolution of hydrogen gas and maintain the discharge performance on a practical level when it is used as an anode active material of an alkaline cell. Further, since no mercury is contained, the alkaline cell comprising this zinc alloy powder as an anode active material satisfies social needs.

PREFERRED EMBODIMENTS OF THE PRESENT INVENTION

The present invention will now be described in more detail with reference to the following Examples and Comparative Examples.

EXAMPLES 1 TO 36 AND COMPARATIVE EXAMPLES 1 TO 7

A melt of zinc alloy was prepared by melting an electrolytically deposited zinc having an iron content of 1 ppm or less at about 500° C. and adding thereto predetermined amounts of elements listed in Table 3 in an atmosphere having an iron content of 0.005 mg/m$^3$ in a room. No element was added in Comparative Example 1.

The melt was directly powdered using high-pressure argon gas (ejection pressure: 5 kg/cm$^2$) in the same atmosphere to give zinc alloy powders, which were sifted to give 50- to 150-mesh powders.

Using a magnet, magnetic separation was performed to thereby remove free iron powder. All of the obtained zinc alloy powders had an iron content of 1 ppm or less.

An electrolyte was prepared by adding about 1.0% of carboxymethylcellulose and polysodium acrylate as a gelating agent to a 40% aqueous potassium hydroxide solution saturated with zinc oxide.

3.0 g of the above-described zinc alloy powder as an anode active material was mixed with 1.5 g of the electrolyte to thereby give a gel. Using the gel as an anode material, the alkaline manganese cell as shown in FIG. 1 was produced.

This alkaline manganese cell was partially discharged by 25%, and the rate of hydrogen gas evolution due to the corrosion of the zinc alloy powder was measured. The results are given in Table 3. the reason for performing the 25% partial discharge is that the rate of hydrogen gas evolution is maximized around 25% partial discharge supposing that the time necessary for discharge to 0.9 V is 100% for a separately prepared non-mercury alkaline manganese cell. It was supposed that discharge conditions of 1Ω and 11 minutes represent 25% partial discharge.

Figure 1:
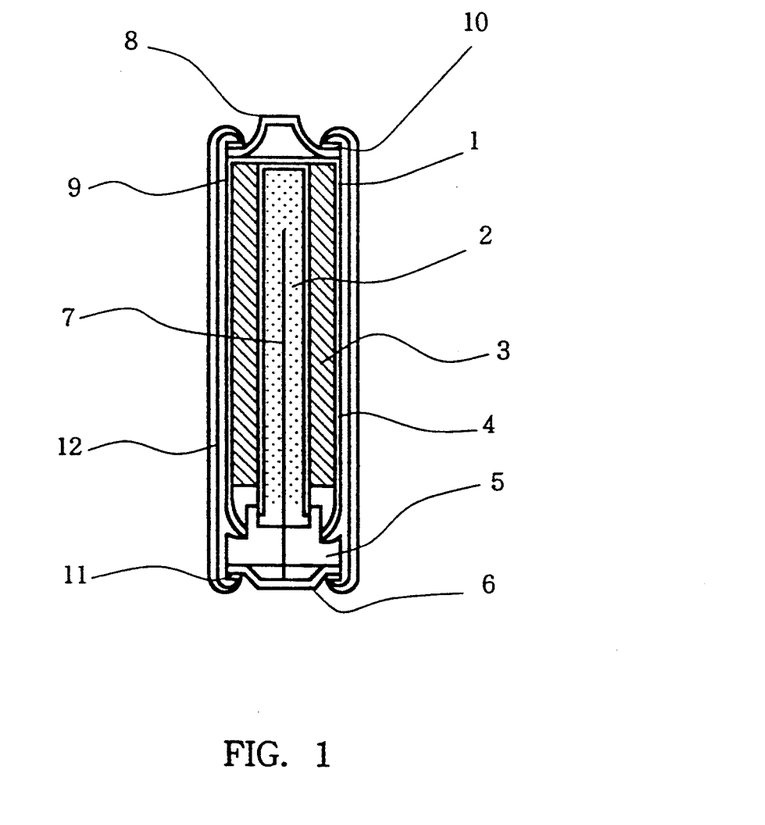
FIG. 1 is a cross-section of side view of an alkaline manganese cell according to the present invention.
Figure 2:
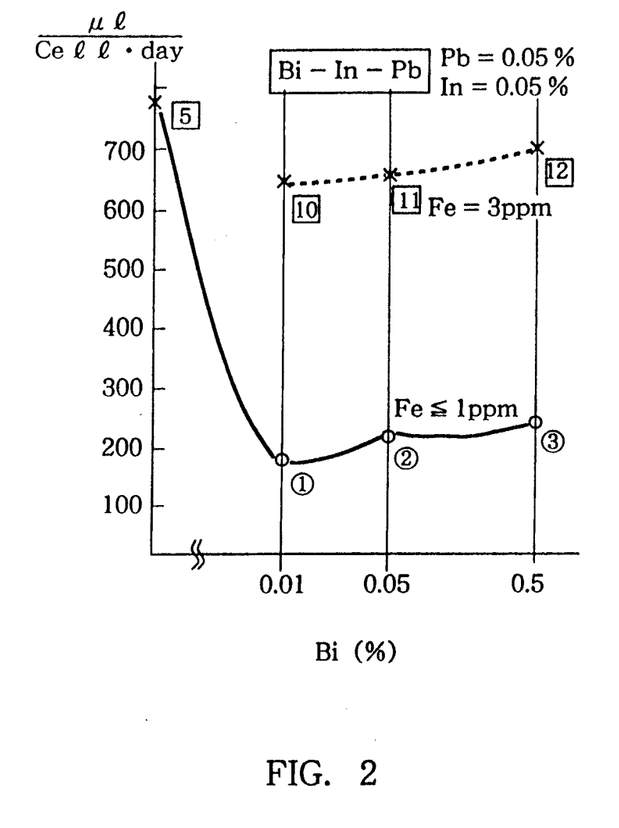
FIG. 2 shows that the evolution of hydrogen gas is less than 300 $\mu$l with the compositions of Examples 2 and 3 while with the compositions of comparative examples 10, 11 and 12 in which the amount of iron is 3 parts per million, the evolution of hydrogen gas is much higher.

The alkaline manganese cell of FIG. 1 is composed of cathode can 1, cathode 2, anode (gelled zinc alloy powder) 3, separator 4, opening sealant 5, anode bottom plate 6, anode electricity collector 7, cap 8, heat-shrinkable resin tube 9, insulating rings 10 and 11 and exterior can 12.

COMPARATIVE EXAMPLES 8 TO 29

A zinc ingot, as a starting material, prepared by casting according to the conventional procedure an electrolytically deposited zinc having an iron content of 1 ppm or less, was melted at about 500° C. in an atmosphere having an iron content of 5 mg/m$^3$. Added to the melt were predetermined amounts of elements listed in Table 2 to give zinc alloy melts.

Each of the melts directly powdered using a high-pressure argon (ejection pressure: 5 k/cm$^2$) in the same atmosphere to give zinc alloy powders, which were sifted to give 50- to 150-mesh powders.

All of the obtained zinc alloy powders had an iron content of 3 ppm. No magnetic selection was performed.

Using each of the zinc alloy powders, an alkaline cell as shown in FIG. 1 was produced in substantially the same manner as that of Example 1 and 25% partial discharge was performed to measure the rate of hydrogen gas evolution. The results are given in Table 2.

TABLE 2

| Ex. No. | Added elements (wt. %)*1 | | | | | | Gas evolution rate $\mu$l/cell · day |
|---|---|---|---|---|---|---|---|
| | Pb | Al | Bi | Ca | In | Fe | |
| Ex. 1 | 0.05 | | 0.01 | | 0.05 | ≦1 | 182 |
| Ex. 2 | 0.05 | | 0.05 | | 0.05 | ≦1 | 230 |
| Ex. 3 | 0.05 | | 0.5 | | 0.05 | ≦1 | 245 |
| Ex. 4 | 0.05 | | 0.05 | | 0.01 | ≦1 | 237 |
| Ex. 5 | 0.05 | | 0.05 | | 0.5 | ≦1 | 211 |
| Ex. 6 | 0.01 | | 0.05 | | 0.05 | ≦1 | 195 |
| Ex. 7 | 0.5 | | 0.05 | | 0.05 | ≦1 | 193 |
| Ex. 8 | | | 0.05 | 0.01 | 0.05 | ≦1 | 107 |
| Ex. 9 | | | 0.05 | 0.05 | 0.05 | ≦1 | 108 |
| Ex. 10 | | | 0.05 | 0.5 | 0.05 | ≦1 | 135 |
| Ex. 11 | 0.01 | | | | | ≦1 | 115 |
| Ex. 12 | 0.05 | | | | | ≦1 | 102 |
| Ex. 13 | 0.5 | | | | | ≦1 | 98 |
| Ex. 14 | 0.05 | 0.01 | | | | ≦1 | 91 |

TABLE 2-continued

| | Added elements (wt. %)[*1] | | | | | Gas evolution rate μl/ |
|---|---|---|---|---|---|---|
| | Pb | Al | Bi | Ca | In | Fe | cell · day |
| Ex. 15 | 0.05 | 0.05 | | | | ≦1 | 87 |
| Ex. 16 | 0.05 | 0.5 | | | | ≦1 | 124 |
| Ex. 17 | 0.05 | | 0.01 | | | ≦1 | 163 |
| Ex. 18 | 0.05 | | 0.05 | | | ≦1 | 180 |
| Ex. 19 | 0.05 | | 0.5 | | | ≦1 | 205 |
| Ex. 20 | 0.05 | | | 0.01 | | ≦1 | 117 |
| Ex. 21 | 0.05 | | | 0.05 | | ≦1 | 122 |
| Ex. 22 | 0.05 | | | 0.5 | | ≦1 | 135 |
| Ex. 23 | 0.05 | 0.05 | 0.05 | | | ≦1 | 105 |
| Ex. 24 | 0.05 | 0.05 | | 0.05 | | ≦1 | 118 |
| Ex. 25 | 0.05 | | 0.05 | 0.05 | | ≦1 | 113 |
| Ex. 26 | | | 0.01 | 0.05 | | ≦1 | 196 |
| Ex. 27 | | | 0.05 | 0.05 | | ≦1 | 208 |
| Ex. 28 | | | 0.5 | 0.05 | | ≦1 | 227 |
| Ex. 29 | | 0.05 | 0.05 | 0.05 | | ≦1 | 201 |
| Ex. 30 | 0.05 | | | 0.01 | 0.05 | ≦1 | 101 |
| Ex. 31 | 0.05 | | | 0.05 | 0.05 | ≦1 | 103 |
| Ex. 32 | 0.05 | | | 0.5 | 0.05 | ≦1 | 115 |
| Ex. 33 | 0.05 | 0.05 | | 0.05 | 0.05 | ≦1 | 95 |
| Ex. 34 | 0.05 | 0.05 | | | 0.05 | ≦1 | 97 |
| Ex. 35 | | | 0.025 | 0.005 | | ≦1 | 243 |
| Ex. 36 | | | 0.025 | 0.005 | 0.05 | ≦1 | 204 |
| Comp. Ex. No. | | | | | | | |
| Comp. Ex. 1 | | | | | | ≦1 | 1728 |
| Comp. Ex. 2 | | | 0.05 | | | ≦1 | 750 |
| Comp. Ex. 3 | | 0.05 | | | | ≦1 | 581 |
| Comp. Ex. 4 | | | | 0.05 | | ≦1 | 767 |
| Comp. Ex. 5 | 0.05 | | | 0.05 | | ≦1 | 768 |
| Comp. Ex. 6 | | 0.05 | | 0.05 | | ≦1 | 529 |
| Comp. Ex. 7 | | | 0.05 | 0.05 | | ≦1 | 472 |
| Comp. Ex. 8 | | | 0.05 | | | 3 | 1850 |
| Comp. Ex. 9 | | 0.05 | | | | 3 | 2250 |
| Comp. Ex. 10 | 0.05 | 0.01 | | 0.05 | | 3 | 648 |
| Comp. Ex. 11 | 0.05 | 0.05 | | 0.05 | | 3 | 670 |
| Comp. Ex. 12 | 0.05 | 0.5 | | 0.05 | | 3 | 725 |
| Comp. Ex. 13 | | 0.05 | 0.01 | 0.05 | | 3 | 635 |
| Comp. Ex. 14 | | 0.05 | 0.05 | 0.05 | | 3 | 550 |
| Comp. Ex. 15 | 0.01 | | | | | 3 | 495 |
| Comp. Ex. 16 | 0.05 | | | | | 3 | 481 |
| Comp. Ex. 17 | 0.5 | | | | | 3 | 474 |
| Comp. Ex. 18 | 0.05 | 0.05 | | | | 3 | 503 |
| Comp. Ex. 19 | 0.05 | | 0.05 | | | 3 | 501 |
| Comp. Ex. 20 | 0.05 | | | 0.05 | | 3 | 515 |
| Comp. Ex. 21 | 0.05 | 0.05 | 0.05 | | | 3 | 514 |
| Comp. Ex. 22 | 0.05 | 0.05 | | 0.05 | | 3 | 517 |
| Comp. Ex. 23 | 0.05 | | 0.05 | 0.05 | | 3 | 492 |
| Comp. Ex. 24 | | | 0.05 | 0.05 | | 3 | 524 |
| Comp. Ex. 25 | | 0.05 | 0.05 | 0.05 | | 3 | 531 |
| Comp. Ex. 26 | 0.05 | 0.05 | 0.05 | | | 3 | 477 |
| Comp. Ex. 27 | 0.05 | 0.05 | | | 0.05 | 3 | 488 |
| Comp. Ex. 28 | | | | 0.05 | 0.05 | 3 | 473 |
| Comp. Ex. 29 | 0.05 | 0.05 | | 0.05 | 0.05 | 3 | 468 |

Note
[*1] ppm only in the case of Fe

As shown in Table 2, in all of the zinc alloy powders of Examples 1 to 34 having an iron content of 1 ppm or less and a specific composition, the rate of hydrogen gas evolution is smaller than about 300 μl/day-cell (type LR6) which is an allowable upper limit of leaktightness. By contrast, in the zinc alloy powders of Comparative Examples 1 to 7, the composition falls outside the scope of the present invention and hence, although the iron content is 1 ppm or less, no effect of suppressing the evolution of hydrogen gas is recognized. Moreover, in the zinc alloy powders of comparative examples 8 to 29, the iron content is 3 ppm and hence, irrespective of whether or not the composition falls within the scope of the present invention, no effect of suppressing the evolution of hydrogen gas is recognized.

There are attached hereto FIGS. 2-12 which show that the present invention has excellent effects on the inhibition of hydrogen gas evolution. In said Figures, numbers each enclosed with a circle refer to the Example numbers respectively; and numbers each enclosed with a spuare refer to the Comparative Example numbers, respectively.

As is apparent from each of these FIGS., an alkaline cell is greatly inhibited from evolving hydrogen gas by using, as an anode active material, zinc alloy powder having an iron content of not more than 1 ppm and containing specified additive elements in respective specified amounts.

EXAMPLES 37 to 40

A zinc alloy powder (Example 35) was produced according to the same composition and conditions as those of Example 12, except that no magnetic separation was performed. a zinc alloy powder (Example 36) was produced according to the same composition and conditions as those of Example 12, except that the melting and the atomization were conducted in an atmosphere of 5 mg/m$^3$.

Similarly, a zinc alloy powder (Example 37) was produced according to the same composition and conditions as those of Example 27, except that no magnetic separation was performed. Further, a zinc alloy powder (Example 38) was produced according to the same composition and conditions as those of Example 27, except that the melting and the atomization were conducted in an atmosphere of 5 mg/m$^3$.

All of the zinc alloy powders thus obtained had an iron content of 1 ppm or less. Using each of the zinc alloy powders, an alkaline cell shown in FIG. 1 was produced in substantially the same manner as that of Example 1 and 25% partial discharge was performed to measure the rate of hydrogen gas evolution. The results are given in Table 3.

TABLE 3

| Ex. No. | Gas Evolution rate μl/cell · day |
|---|---|
| Ex. 37 | 102 |
| Ex. 38 | 102 |
| Ex. 39 | 208 |
| Ex. 40 | 208 |

As is apparent from Table 4, substantially the same results as those of example 12 were obtained in examples 35 and 36, and substantially the same results as those of Example 27 were obtained in Examples 37 to 38.

Experiment

Zinc alloy powders of Example 2 and comparative Example 11 were amalgamated so as to have a mercury content of 1 and 10% by weight, respectively, thereby producing amalgamated zinc alloy powders.

Figure 3:
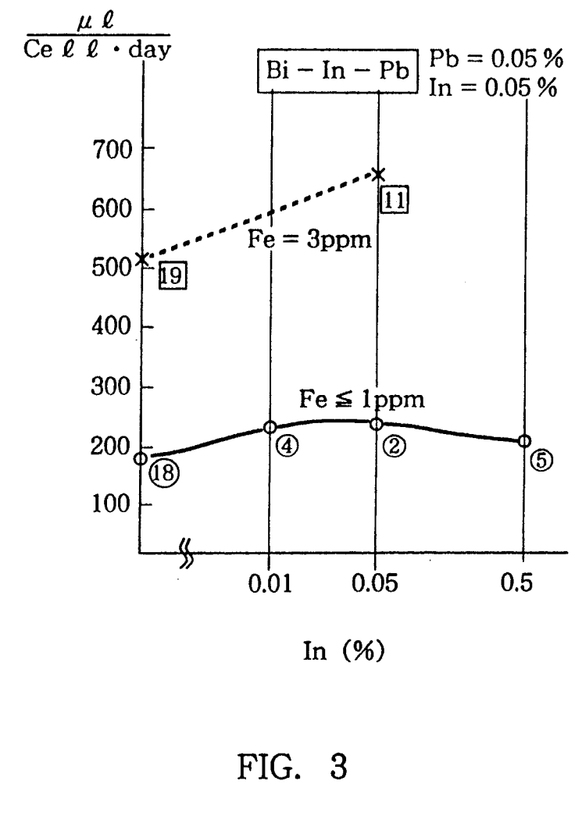
FIG. 3 shows the difference in hydrogen gas evolution between examples 2, 4, and 5 according to the present invention and comparative examples 11 and 19.
Figure 4:
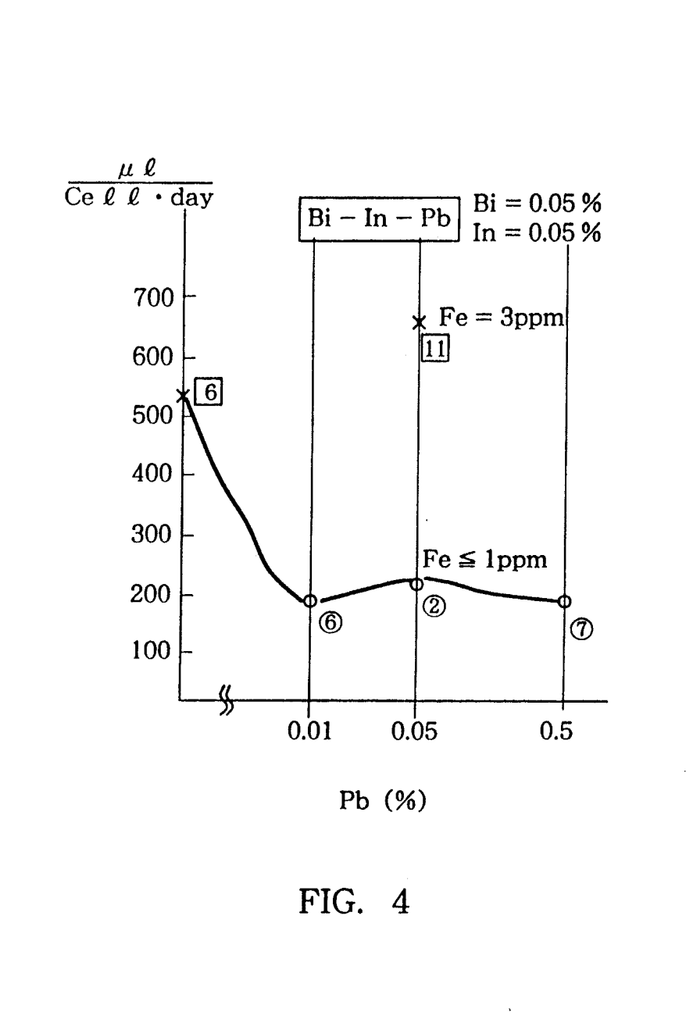
FIG. 4 illustrates the difference in hydrogen gas evolution between examples 2 and 7 and comparative example 11.
Figure 5:
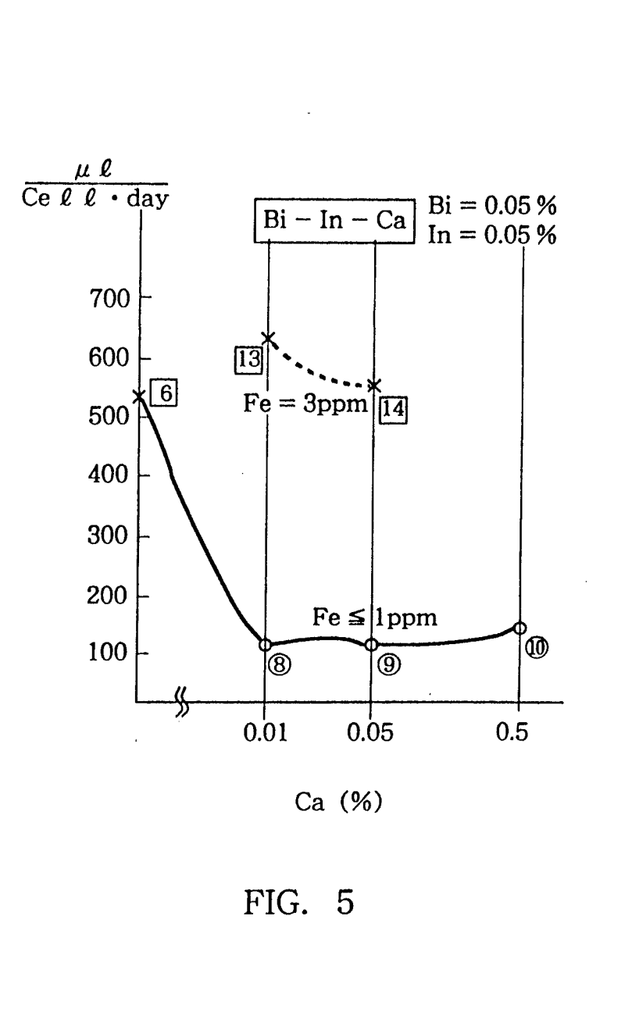
FIG. 5 illustrates the difference in hydrogen gas evolution between examples 8, 9 and 10 according to the present invention and comparative examples 13 and 14.
Figure 6:
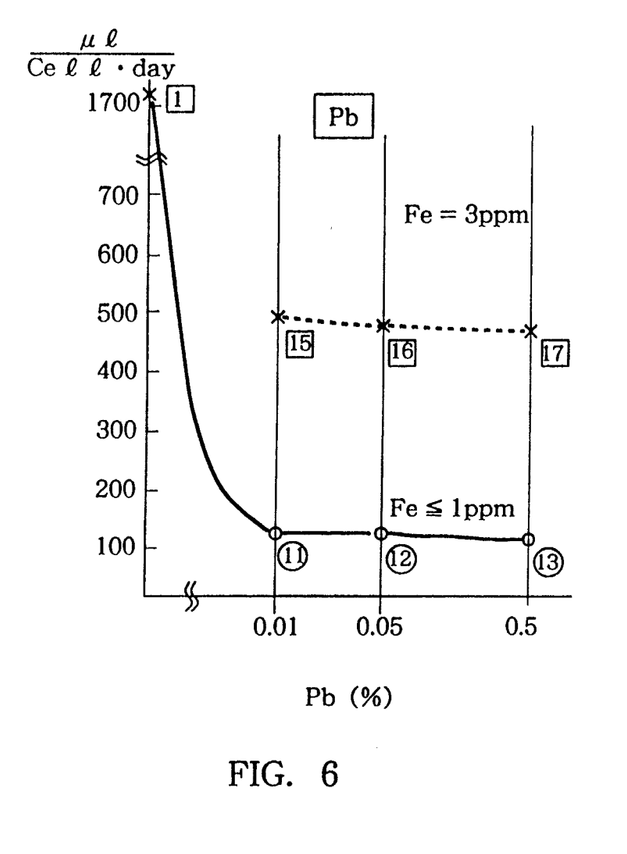
FIG. 6 shows the difference in hydrogen gas evolution between examples 11, 12 and 13 according to the present invention and comparative examples 15, 16 and 17.
Figure 7:
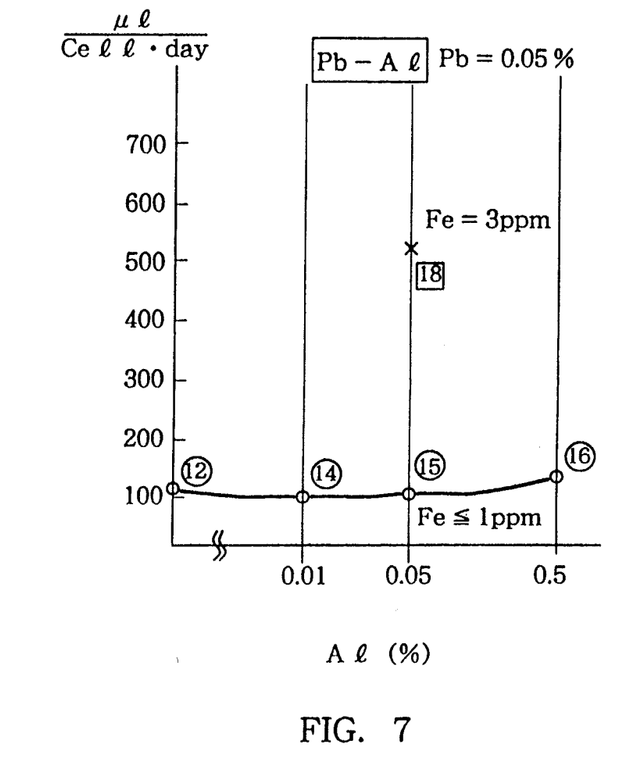
FIG. 7 illustrates the difference in hydrogen gas evolution between examples 14, 15 and 16 and comparative example 18.
Figure 8:
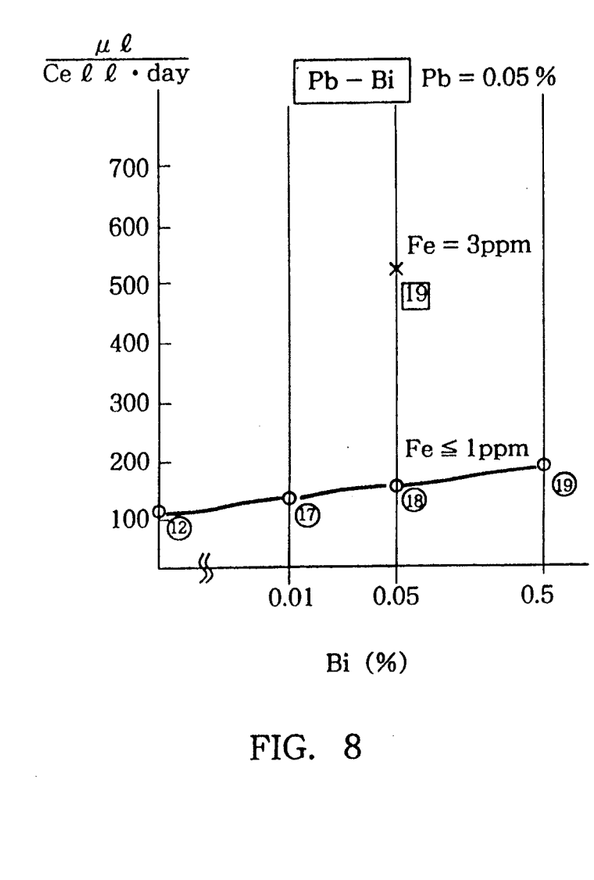
FIG. 8 shows the difference in hydrogen gas evolution between examples 17, 18 and 19 according to the present invention and comparative example 19.
Figure 9:
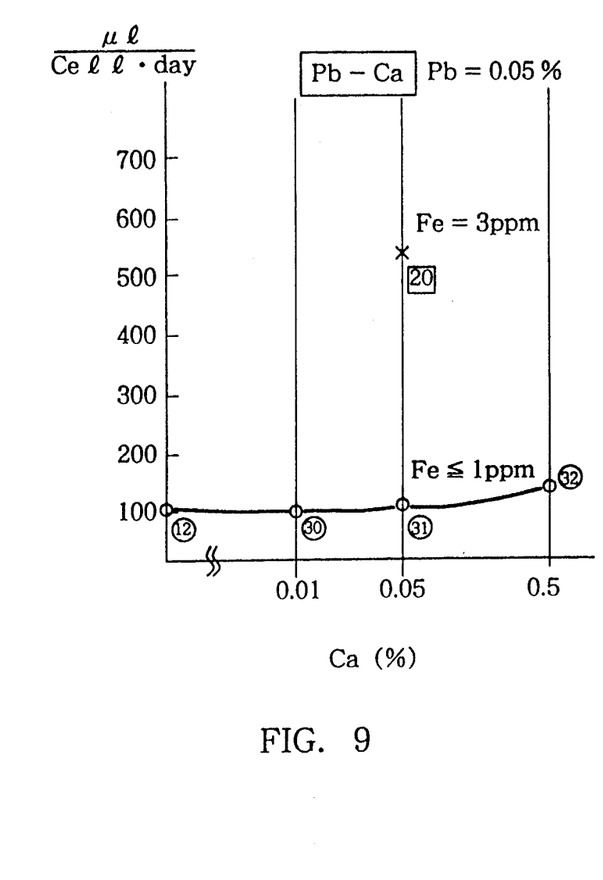
FIG. 9 illustrates the difference in hydrogen gas evolution between examples 30, 31 and 32 and comparative example 20.
Figure 10:
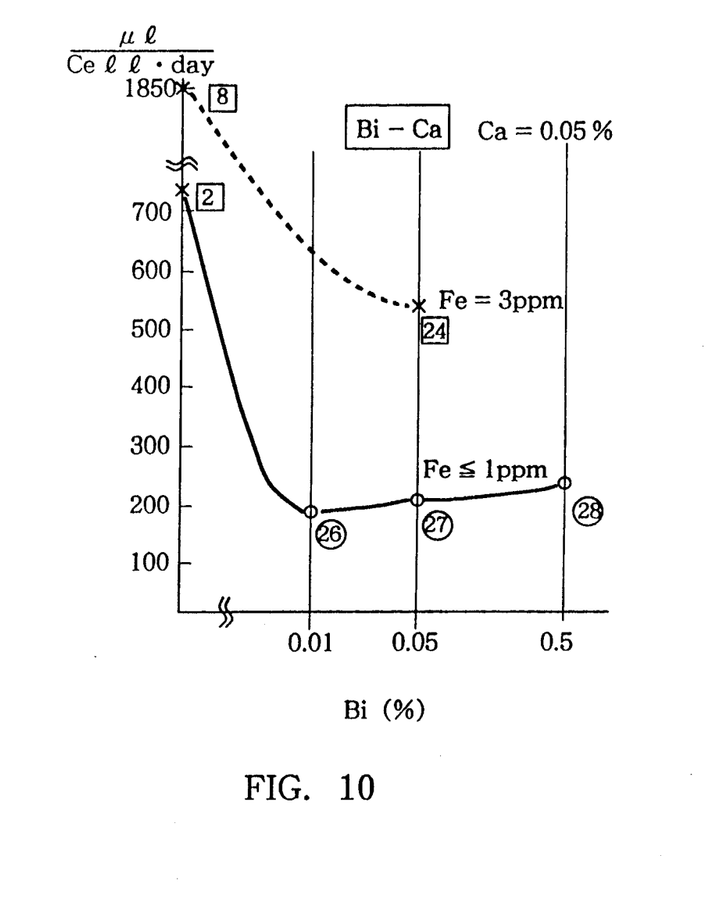
FIG. 10 shows the difference in hydrogen gas evolution between examples 26, 27 and 28 according to the present invention and comparative example 24.
Figure 11:
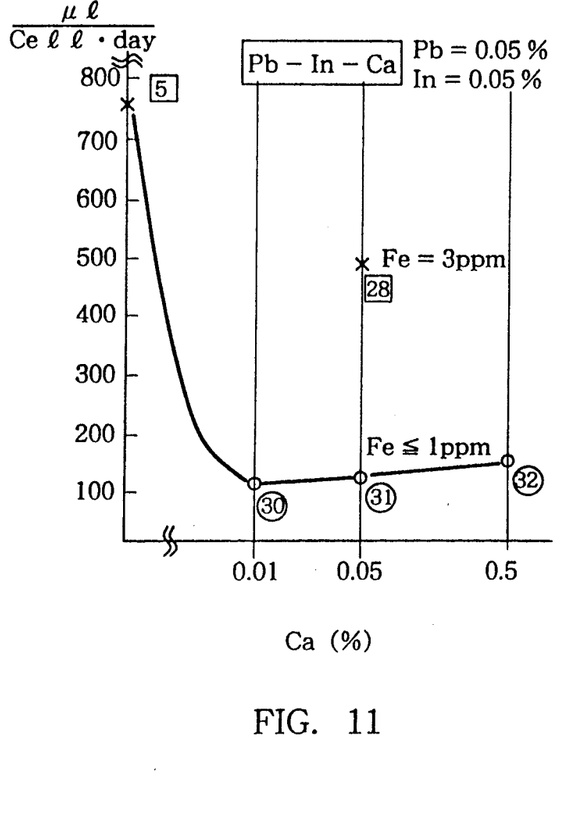
FIG. 11 illustrates the difference in hydrogen gas evolution between examples 30, 31 and 32 and comparative example 28.
Figure 12:
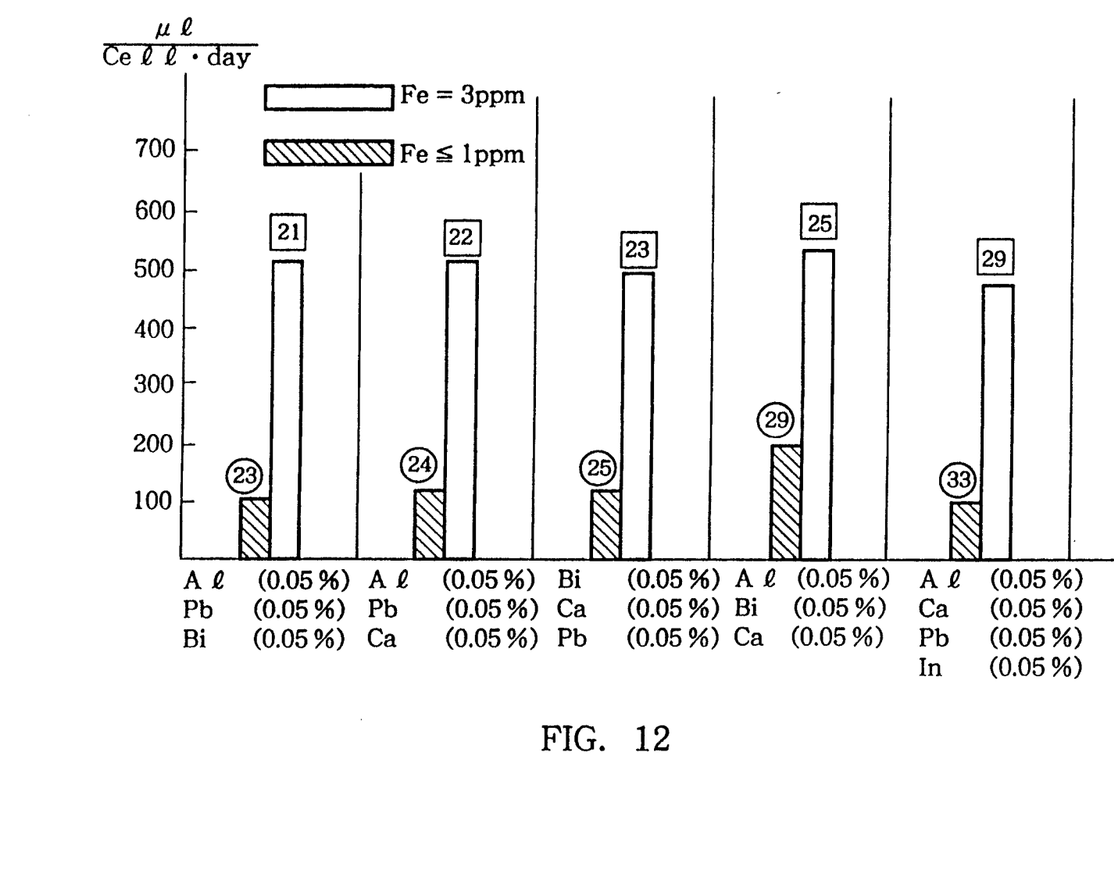
FIG. 12 shows the difference in hydrogen gas evolution between examples 23, 24, 25, 29 and 33 and comparative examples 21, 22, 23, 25 and 29.

Using each of the amalgamated zinc alloy powders, an alkaline cell shown in FIG. 1 was produced in substantially the same manner as that of Example 1 and 25% partial discharge was conducted to measure the rate of hydrogen gas evolution. The results were plotted together with the values of Example 2 and Comparative Example 11 as shown in FIG. 3.

Figure 13:
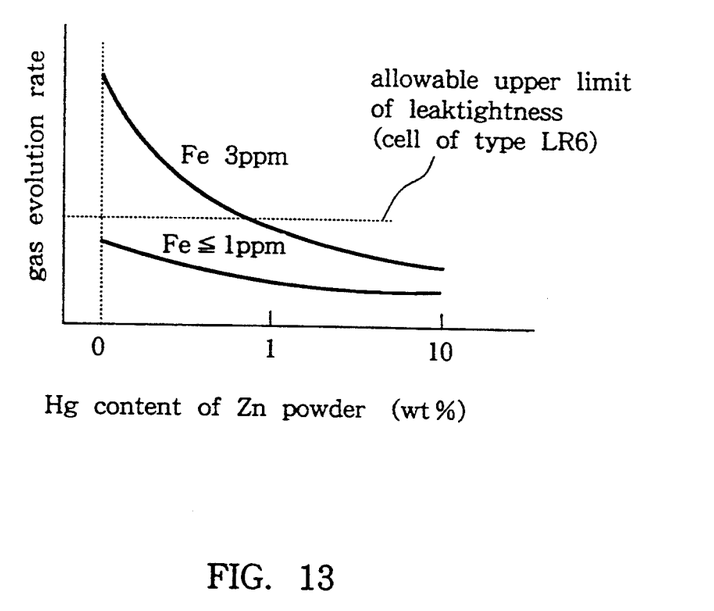
FIG. 13 is a graph showing the relationship between the mercury content of a zinc alloy powder and the rate of hydrogen gas evolution.

As indicated in FIG. 13., when the iron content is 3 ppm, the evolution of hydrogen gas is below the allowable upper limit of leaktightness at a mercury content of 1% by weight or greater. By contrast, when the iron content is 1 ppm or less, the evolution of hydrogen gas is below the allowable upper limit of leaktightness irrespective of the presence or absence of mercury.

A similar test was conducted on the zinc alloy powders of Example 12 and Comparative Example 16 to give substantially the same results.

What is claimed is:

1. A non-amalgamated zinc alloy powder for use in an alkaline cell, which consists of 0.01 to 0.5% by weight of bismuth, 0.01 to 0.5% by weight of indium, not less than 0.005% by weight to less than 0.01% by weight of calcium, containing 1 ppm or less of iron, the balance being zinc.

2. A non-amalgamated zinc alloy powder for use in an alkaline cell, which consists of not less than 0.005% by weight to less than 0.01% by weight of calcium, 0.01 to 0.5% by weight of bismuth, 0 to 0.5% by weight of aluminium, containing 1 ppm or less of iron, the balance being zinc.

3. A non-amalgamated zinc alloy powder for use in an alkaline cell, which consists of 0.01 to 0.5% by weight of lead, 0.01 to 0.5% by weight of indium, 0 to less than 0.01% by weight of calcium, 0.01 to 0.5% by weight of aluminium, containing 1 ppm or less of iron, the balance being zinc.

4. The method to produce a non-amalgamated zinc alloy powder for use in an alkaline cell, having an iron content of not more than 1 ppm as an inevitably accidental impurity, which consists of melting an electrolytic deposit zinc obtained by electrolysis and containing iron in an amount of 1 ppm or less, together with elements in such amounts in one of the following compositions (1) to (3), (1) 0.01 to 0.5% by weight of bismuth, 0.01 to 0.5% by weight of indium and not less than 0.005% by weight to less than 0.01% by weight of calcium, (2) not less than 0.005% by weight to less than 0.01% by weight of calcium, 0.01 to 0.5% by weight of bismuth, 0 to 0.5% by weight of aluminum, and (3) 0.01 to 0.5% by weight of lead, 0.01 to 0.5% by weight of indium, 0 to less than 0.01% by weight of calcium, 0.01 to 0.5% by weight of aluminum, and directly atomizing the formed melt.

5. The method to produce a non-amalgamated zinc alloy powder for use in an alkaline cell according to claim 4, wherein the melting and the atomization are conducted in an atmosphere having an iron content of 0.009 mg/m$^3$ or less.

6. The method to produce a non-amalgamated zinc alloy powder for use in an alkaline cell according to claim 4, wherein the atomized powder is magnetically separated.

7. The method to produce a non-amalgamated zinc alloy powder for use in an alkaline cell according to claim 5, wherein the atomized powder is magnetically separated.

8. The alkaline cell comprising the non-amalgamated zinc alloy powder according to claim 1 as an anode active material.

9. The alkaline cell comprising the non-amalgamated zinc alloy powder according to claim 2 as an anode active material.

10. The alkaline cell comprising the non-amalgamated zinc alloy powder according to claim 3 as an anode active material.

* * * * *